(12) United States Patent
Chang

(10) Patent No.: US 7,372,413 B2
(45) Date of Patent: May 13, 2008

(54) MOBILE COMMUNICATION DEVICE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/616,848

(22) Filed: Dec. 27, 2006

(65) Prior Publication Data

US 2008/0076347 A1 Mar. 27, 2008

(30) Foreign Application Priority Data

Sep. 1, 2006 (CN) .................... 2006 1 0062439

(51) Int. Cl.
*H01Q 1/24* (2006.01)
(52) U.S. Cl. .............. 343/702; 359/819; 359/820; 455/575.1; 455/575.3; 379/433.01
(58) Field of Classification Search ........ 359/818, 359/820, 821, 826; 455/575.1, 575.3, 90.3; 235/462.01, 462.25; 379/433.01, 433.11, 379/433.13; 343/702
See application file for complete search history.

(56) References Cited

U.S. PATENT DOCUMENTS 7,031,083 B2 4/2006 Chen
7,058,433 B2 * 6/2006 Carpenter ............... 455/575.1
7,227,236 B1 * 6/2007 Lee et al. .................. 257/433
2005/0054377 A1 * 3/2005 Yeh ......................... 455/556.1
2005/0141703 A1 * 6/2005 Hickey et al. ......... 379/433.13
2007/0216796 A1 * 9/2007 Lenel et al. ............... 348/345
2007/0242940 A1 * 10/2007 Yumiki et al. ............... 396/79

* cited by examiner

*Primary Examiner*—Tho Phan
(74) *Attorney, Agent, or Firm*—Jeffrey T. Knapp

(57) ABSTRACT

A mobile communication device (100) includes a main body (110), a cover body (120) and a linking member (130). The cover body is coupled to the main body and is movable relative to the main body. The cover body includes a lens module (121), an image sensor module (122) and at least one elastic member (123). One of the lens module and the image sensor module has at least one protrusion (121a) thereon. The linking member has a first end portion (131) coupled to the cover body and an opposite second end portion (132) coupled to the main body. The first end portion includes a sloping portion (131a) interposed between the lens module and the image sensor module. The protrusion abuts against the sloping portion. The linking member is driven by movement of the cover body relative to the main body, thus adjusting a distance between the lens module and the image sensor module.

11 Claims, 7 Drawing Sheets

MOBILE COMMUNICATION DEVICE

BACKGROUND

1. Technical Field

The invention relates generally to mobile communication devices, and more particularly to a mobile communication device, for example, a mobile phone with a digital camera module having a focusing function.

2. Description of Related Art

Currently, digital camera modules are in widespread use in a variety of portable electronic devices, such as mobile phones, notebook computers and personal digital assistants (PDAs). Most portable electronic devices are becoming progressively more miniaturized over time, and digital camera modules are correspondingly becoming smaller and smaller. Besides having a small size of a digital camera module, consumers still demand excellent imaging performance, such as focusing function.

Focusing techniques have been widely employed in various imaging systems, including, e.g., still camera systems and video camera systems. The focusing function is carried out by a mechanism wherein a distance between a lens assembly and an image sensor is varied by changing the internal spacing of two or more of the elements of the camera module along an optical axis. Generally, the camera module usually uses an actuator, such as step motor, to drive a lens assembly of the camera module to achieve the focusing function. However, the step motor is relatively bulky in volume. In addition, the step motor consumes a substantial amount of power, especially relative to the amount of power that can be stored in the typical battery system.

What is needed, therefore, is a mobile communication device with a digital camera module having a simple and energy-efficient focusing mechanism.

SUMMARY OF THE INVENTION

A mobile communication device is provided. In one embodiment, the mobile communication device includes a main body, a cover body and a linking member. The cover body is coupled to the main body and is movable relative to the main body between a first operational position and a second operational position. The cover body includes a lens module, an image sensor module and at least one elastic member for applying a force on the lens module toward the image sensor module. One of the lens module and the image sensor module has at least one protrusion thereon. The cover body is rotatable relative to and on the main body. In another embodiment, the cover body is slidable relative to the main body.

The linking member has a first end portion coupled to the cover body and an opposite second end portion coupled to the main body. The first end portion includes a sloping portion interposed between the lens module and the image sensor module. The protrusion abuts against the sloping portion of the linking member. The linking member is driven by movement of the cover body relative to the main body to be movable between the first operational position, where the protrusion abuts against and on a higher region of the sloping portion, and the second operational position, where the protrusion abuts against and on a lower region of the sloping portion, thus adjusting a distance between the lens module and the image sensor module.

Advantages and novel features of the present mobile communication device will become more apparent from the following detailed description of preferred embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present invention.

Figure 1:
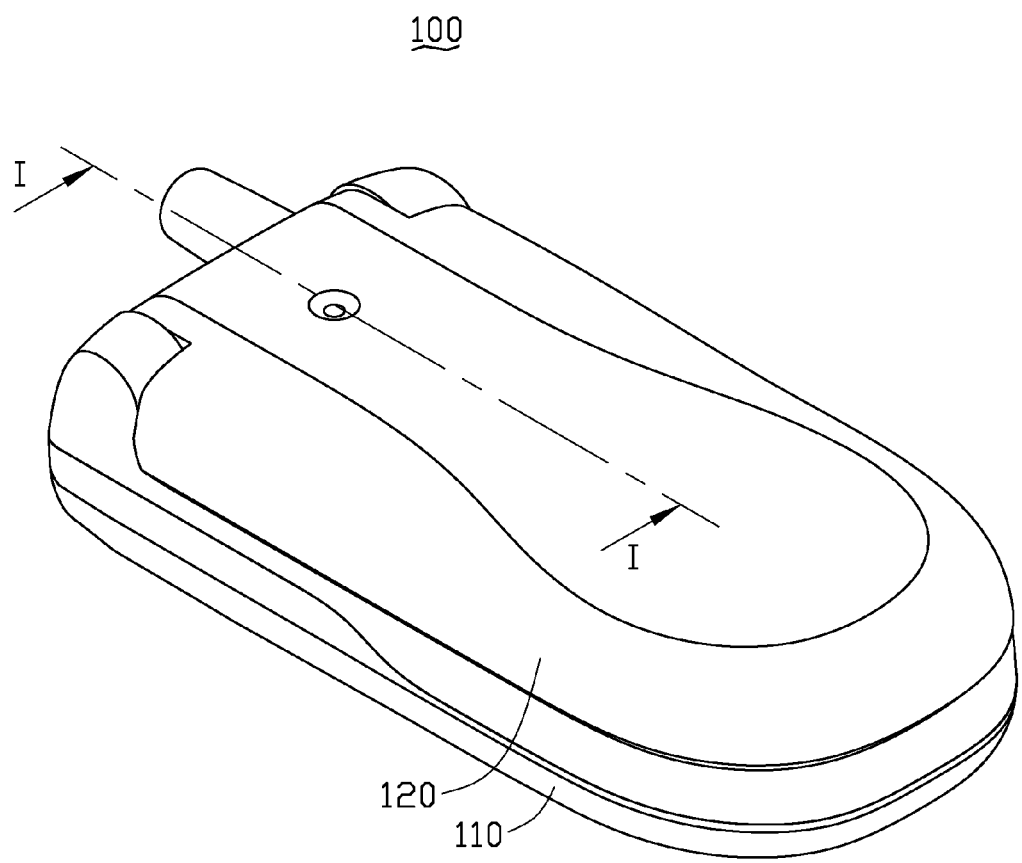
FIG. 1 is an isometric view of a folding mobile communication device with a digital camera module having a focusing mechanism in accordance with a first preferred embodiment of the present invention.

Corresponding reference characters indicate corresponding parts throughout the several views. The exemplifications set out herein illustrate at least one preferred embodiment of the present mobile communication device, in one form, and such exemplifications are not to be construed as limiting the scope of the invention in any manner.

DETAILED DESCRIPTION OF THE INVENTION

Reference will now be made to the drawing to describe embodiments of the present mobile communication device in detail.

Referring to FIG. 1, a folding mobile communication device 100 with a digital camera module having a focusing mechanism in accordance with a first preferred embodiment of the present invention is shown. Also referring to FIG. 2, a cross-sectional view of the folding mobile communication device of FIG. 1 in a first operational position (closed position) taken along I-I line is shown. The mobile communication device 100 includes a main body 110, a cover body 120 and a linking member 130. The cover body 120 is coupled to the main body 110 and is movable relative to the main body 110 between the first operational position (closed position) and a second operational position (opened position). In the first preferred embodiment, the cover body 120 is rotatable relative to and on the main body 110.

The cover body 120 includes a lens module 121, an image sensor module 122 and at least one elastic member 123 for applying a force on the lens module 121 toward the image sensor module 122. The lens module 121 has at least one protrusion 121a thereon. The cover body 120 further defines a light opening 124 on an outside surface thereof. The lens module 121, the image sensor module 122 and the elastic member 123 are placed inside the cover body 121 and under the light opening 124. A distance between the lens module 121 and the image sensor module 122 is greatest when the folding mobile communication device 100 is in the first operational position.

The linking member 130 has a first end portion 131 coupled to the cover body 120 and an opposite second end portion 132 coupled to the main body 110. The first end portion 131 includes a sloping portion 131a interposed between the lens module 121 and the image sensor module 122. The protrusion 121a abuts against the sloping portion 131a of the linking member 130. The linking member 130 is a flexible belt with racks formed thereon. The folding mobile communication device 100 further includes a hinge shaft having a gear portion 140. The hinge shaft having a gear portion 140 is meshed with the racks of the linking member 130. The linking member 130 is stretched from the cover body 120 to a hinge shaft having a gear portion 140, then to the main body 110. The second end portion 132 of the linking member 130 is interposed between a linking member holder 111. When the hinge shaft having a gear portion 140 rotates, the linking member 130 moves together with it.

Figure 3:
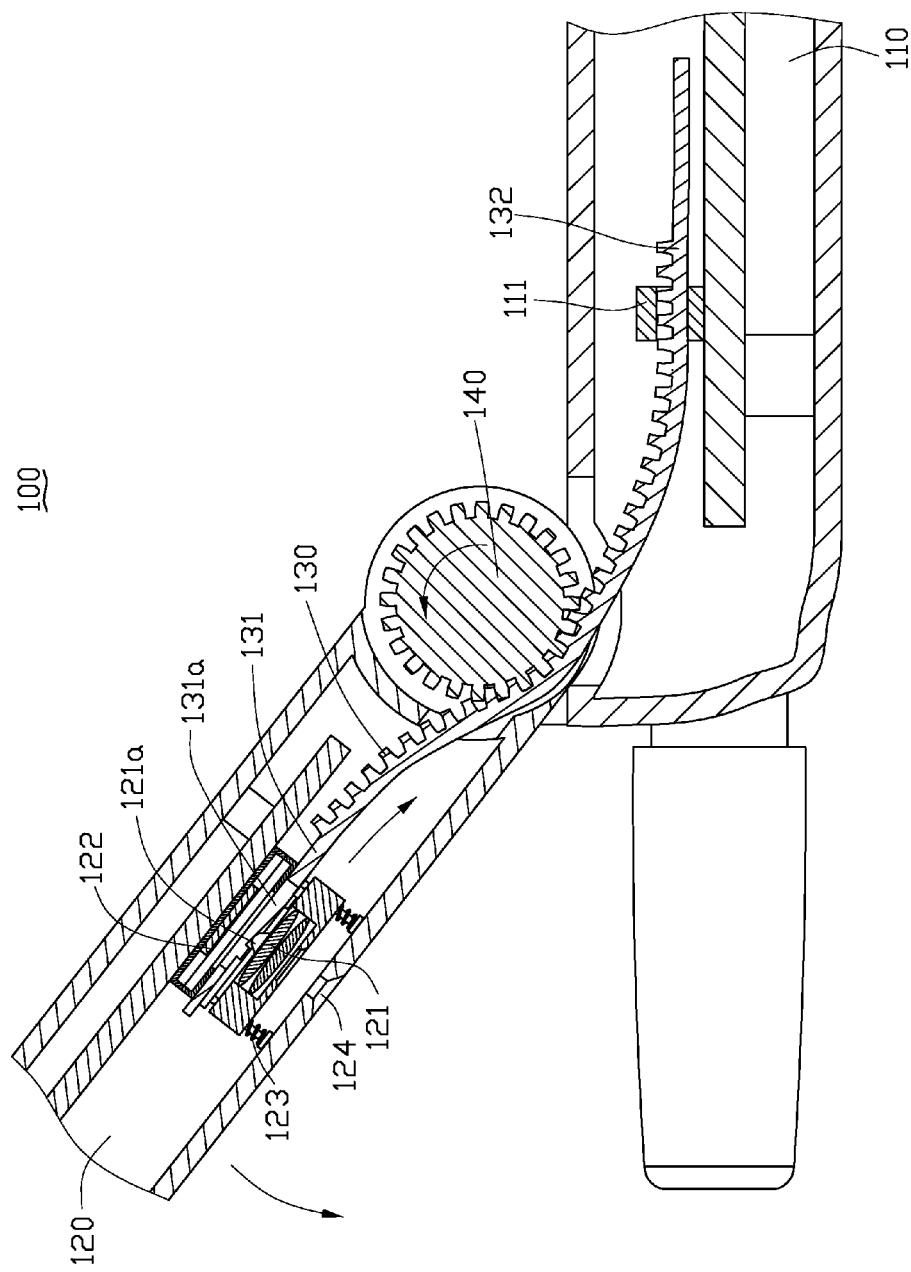
FIG. 3 is a cross-sectional view of the folding mobile communication device of FIG. 1 in a second operational position (opened position) taken along I-I line.

Referring to FIG. 3, a cross-sectional view of the folding mobile communication device of FIG. 1 in the second operational position taken along I-I line is shown. When the folding mobile communication device 100 is opened up, the hinge shaft having a gear portion 140 is also rotated because of the relative motion of the cover body 120 and the main body 110. The rotation of the hinge shaft having a gear portion 140 can make the linking member 130 move together with it (see arrows labeled in FIG. 3).

The linking member 130 is driven by movement of the cover body 120 relative to the main body 110 to move between the first operational position, where the protrusion 121a abuts against and on a higher region of the sloping portion 131a, and the second operational position, where the protrusion 121a abuts against and on a lower region of the sloping portion 131a. Because of a slope angle change of the sloping portion 131a and a recovery force of the elastic member 123, the present invention can adjust a distance between the lens module 121 and the image sensor module 122. The distance becomes less when the folding communication device 100 is opened. Vice versa, the distance becomes greater when the electronic device 100 is closed.

Figure 2:
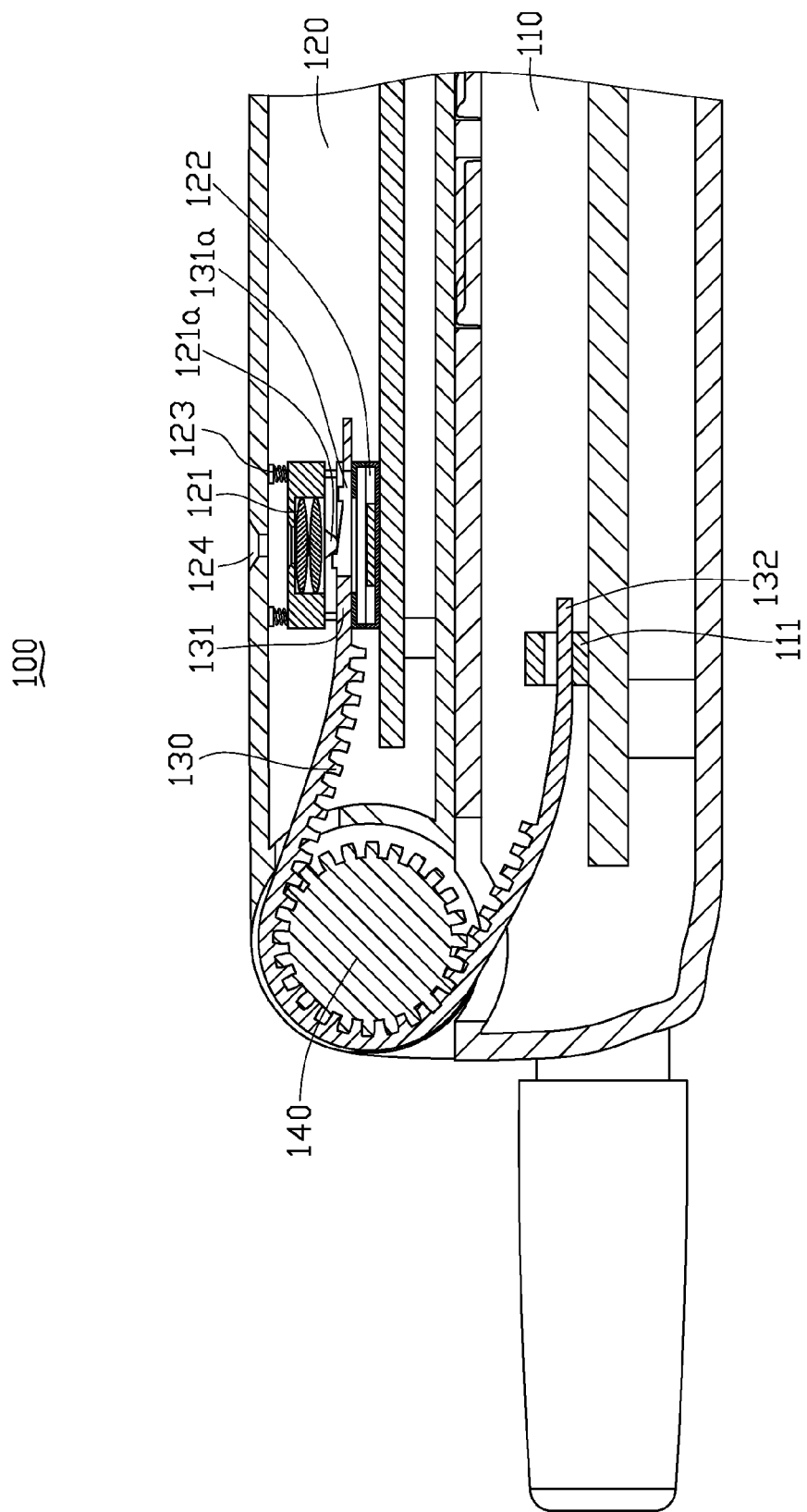
FIG. 2 is a cross-sectional view of the folding mobile communication device of FIG. 1 in a first operational position (closed position) taken along I-I line.
Figure 4:
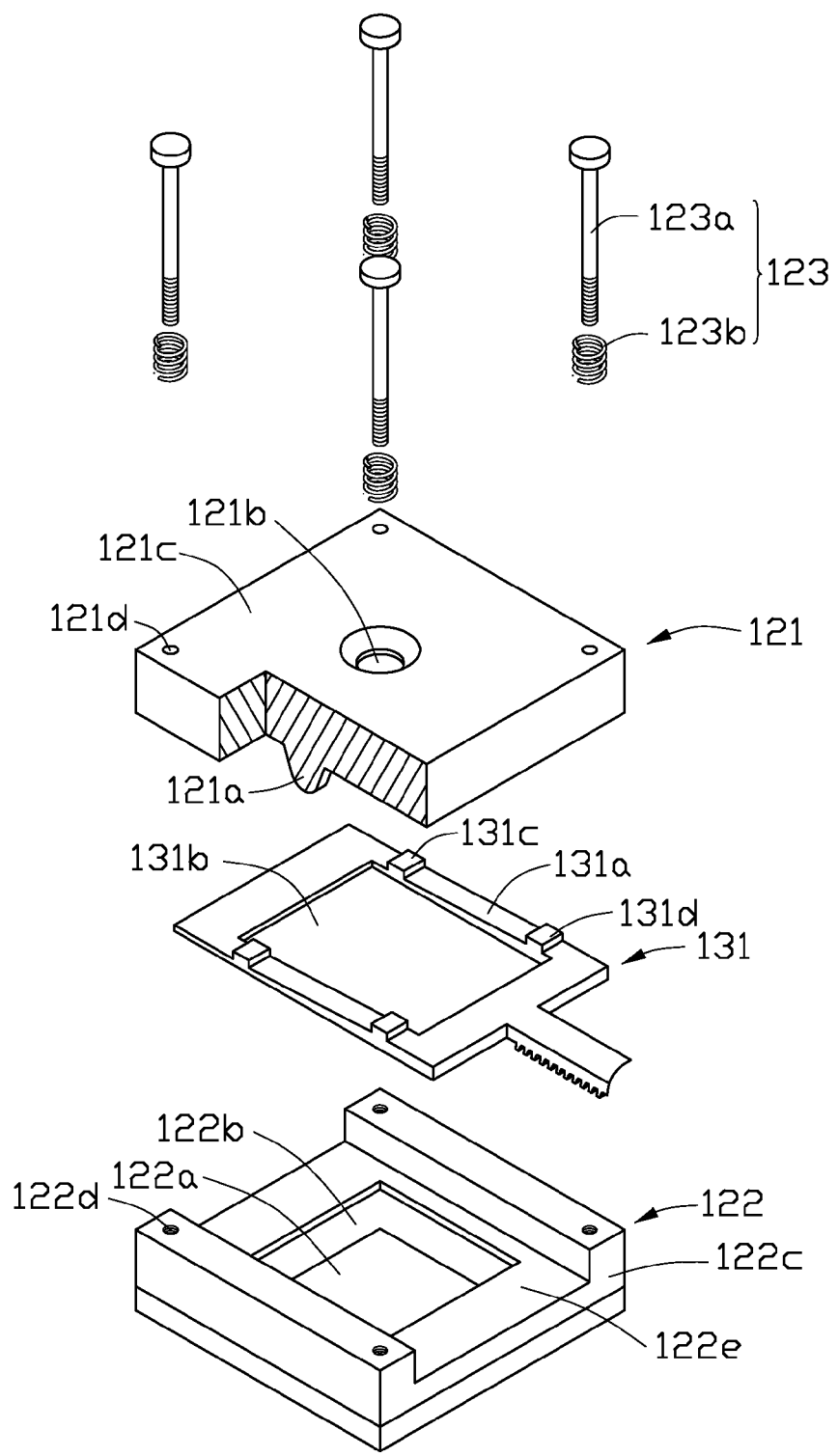
FIG. 4 is an exploded, isometric view of an assembly of a lens module, a first end portion of a linking member, a image sensor module and at least one elastic member of FIG. 2.

Referring to FIG. 4, an exploded, isometric view of an assembly of the lens module 121, the first end portion of a linking member 131, the image sensor module 122 and at least one elastic member 123 of FIG. 2 is shown. The first end portion 131 is placed between the lens module 121 and the image sensor module 122. The elastic member 123 can fix the lens module 121, the image sensor module 122 and the first end portion 131 elastically.

The lens module 121 includes at least one lens 121b, a holder 121c and the protrusion 121a thereon. The holder 121c has a cavity defined at the center thereof for receiving the lens 121b therein. The lens 121b is used to receive incident light that contains image information. The protrusion 121a is a curved or rounded tip end portion which are extended from the bottom surface of the holder 121c. The protrusion 121a is positioned at two opposite sides of the lens 121b and is configured (i.e., structured and arranged) to match with the sloping portion 131a. The shapes of the protrusion 121a can be semi-spherical or any shape that can match with the sloping portion 131a. Besides, several holes 121d are defined at the corners of the holder 121c for letting the elastic members 123 pass there through.

The first end portion 131 includes a through hole 131b and a sloping portion 131a located at opposite sides of the through hole 131b. The through hole 131b can allow incident light comes from the lens module 121 to pass there through. The sloping portion 131a abuts against to the protrusion 121a and is movable when an external force is exerted thereapon. The first end portion 131 further includes a number of protrusion stops 131c and 131d placed at ends of the sloping portion 131a, so that the protrusion 121a can only move between the protrusion stops 131c and 131d. When a pulling or a pushing force is exerted on the first end portion 131, the sloping portion 131a can move freely and drive the light module 121 up and down at the same time. By a relative movement of the sloping portion 131a and the light module 121, the present invention can control the distance between the lens module 121 and the image sensor 122.

The image sensor 122 includes a sensing chip 122a, a signal processing element 122b and a box 122c. The image sensor 122 can be Charge-Coupled Device (CCD) or Complementary Metal Oxide Semiconductor (CMOS) device. The box 122c defines an opening cavity 122e. The first end portion 131 is received in the opening cavity 122e. A width of the opening cavity 122e is less than the width of the image sensor 122 and is equal to the width of the first end portion 131. Therefore, the sloping portion 131 can move in the opening cavity 122e freely. The image sensor 122 further includes a number of holes 122d defined at the corners of the box 122c for letting the elastic members 123 pass therethrough.

The elastic member 123 includes a spring 123a and a screw bolt 123b. In the first preferred embodiment, the present invention uses four elastic members 123 to fix the light module 121, the first end portion 131 and the image sensor module 122 elastically. A fixing method includes steps of putting the springs 123a on the screw bolts 123b; then inserting the elastic member 123 to pass through the holes on the light module 121d; finally fastening the elastic members 123 with the holes on the image sensor 122d.

Figure 5:
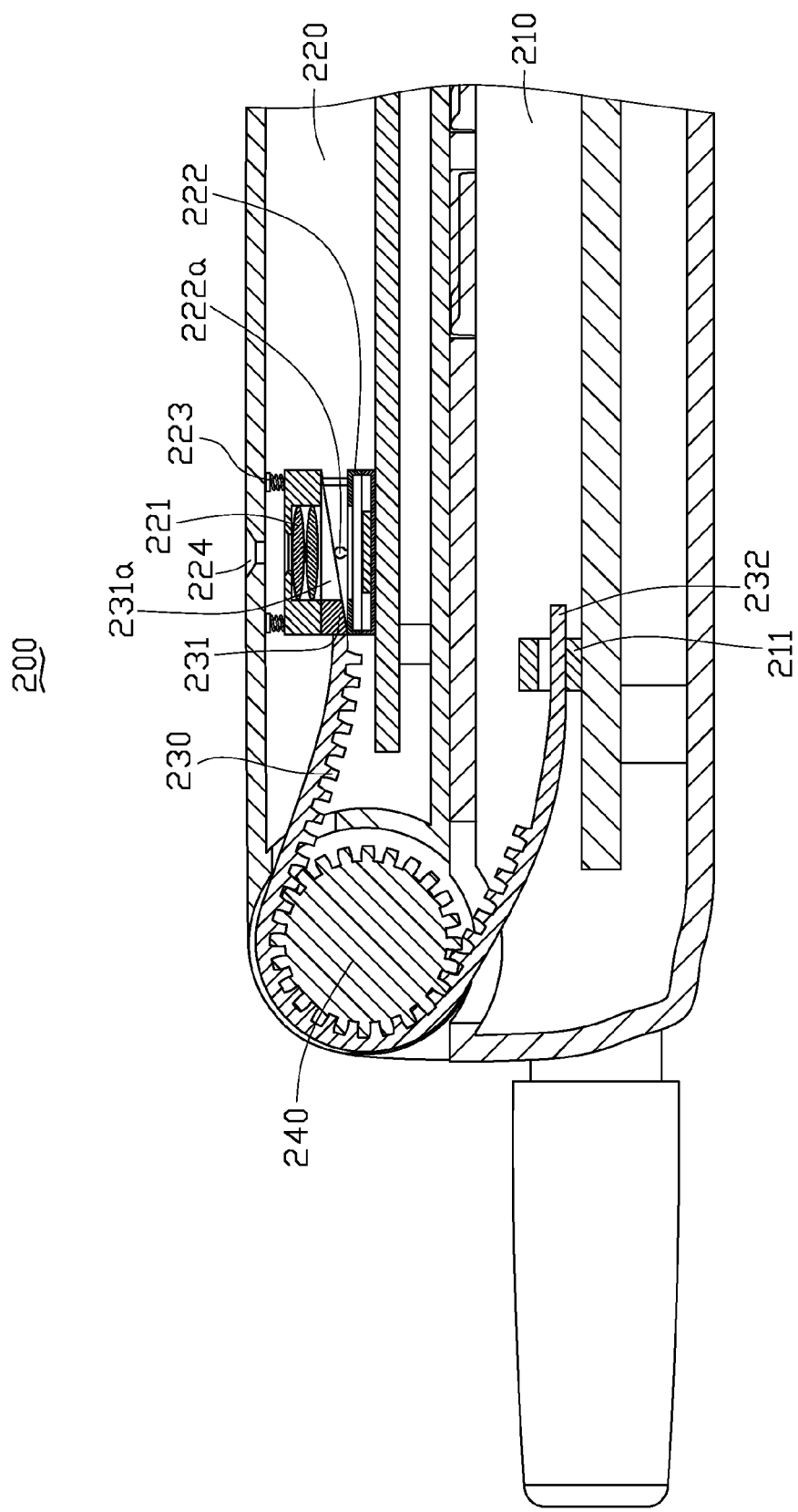
FIG. 5 is a cross-sectional view of a mobile communication device with a protrusion placed on an image sensor module in accordance with a second preferred embodiment of the present invention.

A protrusion can be placed either on a lens module or on an image sensor module. Referring to FIG. 5, a cross-sectional view of a mobile communication device 200 with a protrusion placed on an image sensor module is shown in accordance with a second preferred embodiment of the present invention. The mobile communication device 200 includes a main body 210, a cover body 220 and a linking member 230. The cover body 220 is coupled to the main body 210 and is movable relative to the main body 210 between a first operational position and a second operational position.

The cover body 220 includes a lens module 221, an image sensor module 222 and at least one elastic member 223 for applying a force on the lens module 221 toward the image sensor module 222. The image sensor module 222 has at least one protrusion 222a thereon. The cover body q20 further defines a light opening 224 on an outside surface thereof. The lens module 221, the image sensor module 222 and the elastic member 223 are placed inside the cover body 221 and under the light opening 224. A distance between the lens module 221 and the image sensor module 222 is greatest when the mobile communication device 200 is in the first operational position.

The linking member 230 has a first end portion 231 coupled to the cover body 220 and an opposite second end portion 232 coupled to the main body 210. The first end portion 231 includes a sloping portion 231a interposed between the lens module 221 and the image sensor module 222. The protrusion 221a abuts against the sloping portion 231a. The linking member 230 is a flexible belt with racks formed thereon. The mobile communication device 200 further includes a hinge shaft having a gear portion 240. The hinge shaft having a gear portion 240 is meshed with the racks of the linking member 230. The linking member 230 is stretched from the cover body 220 to a hinge shaft having a gear portion 240, and then to the main body 210. The second end portion 232 of the linking member 230 is interposed between a linking member holder 211. When the hinge shaft having a gear portion 240 rotates, the linking member 230 can move together for adjusting a distance between the light module 221 and the image sensor module 222.

Figure 6:
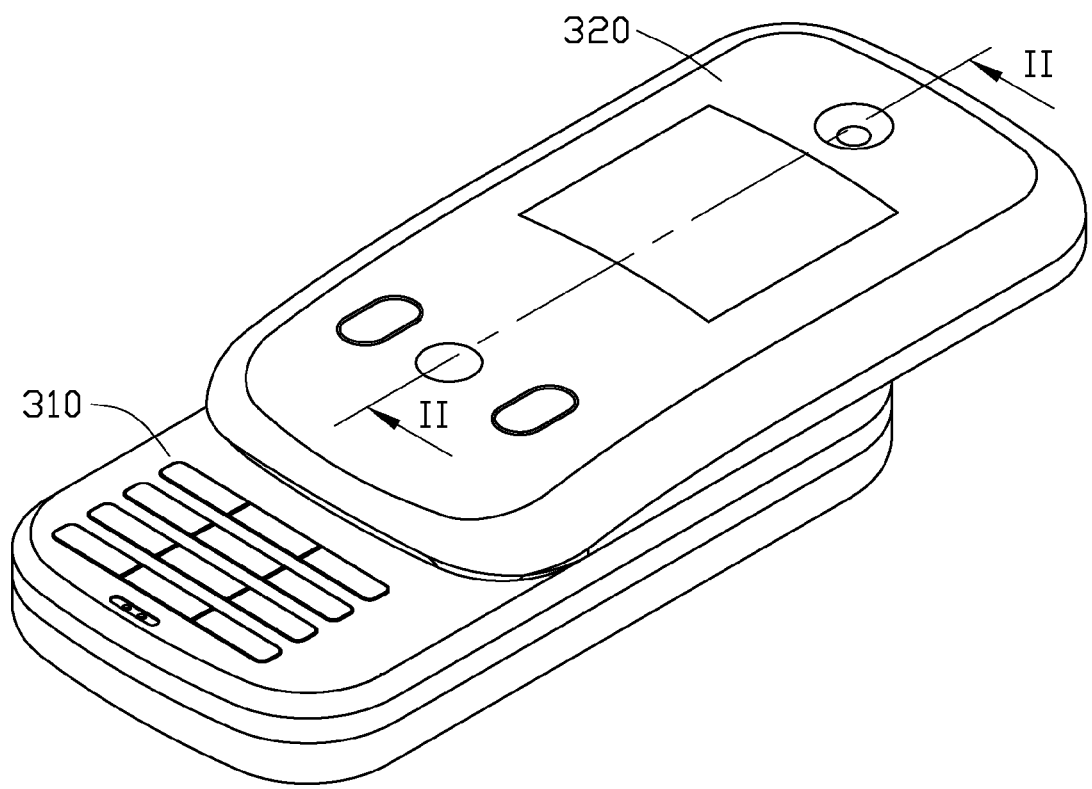
FIG. 6 is an isometric view of a sliding mobile communication device with a digital camera module having a focusing mechanism in accordance with a third preferred embodiment of the present invention.
Figure 7:
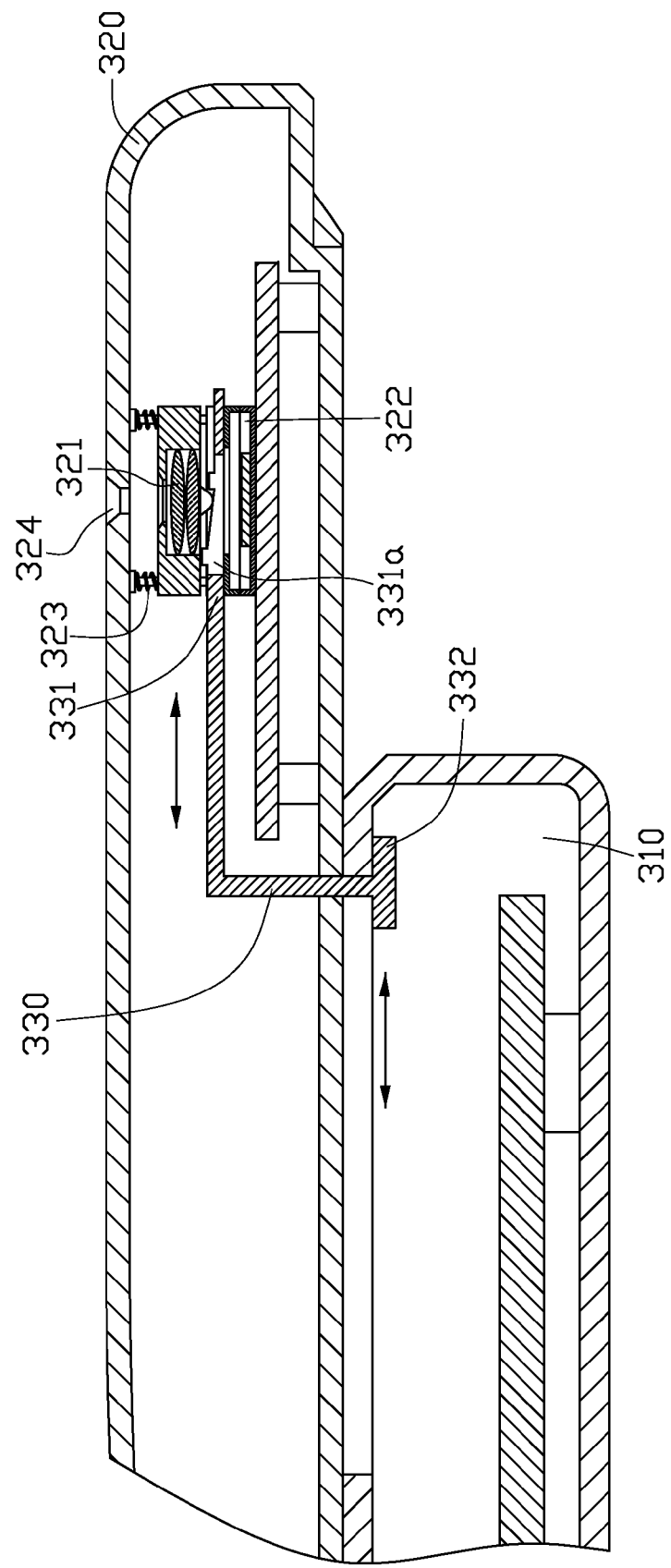
FIG. 7 is a cross-sectional view of the sliding mobile communication device of FIG. 6 taken along II-II line and shows a distance between a lens module and an image sensor module adjusted according to a relative motion mechanism of the sliding mobile communication device.

Referring to FIG. 6, a sliding mobile communication device 300 in accordance with a third preferred embodiment of the present invention is shown. Also referring to FIG. 7, a cross-sectional view of the sliding mobile communication device of FIG. 6 taken along II-II line is shown. The mobile communication device 300 includes a main body 310, a cover body 320 and a linking member 330. The cover body 320 is coupled to the main body 310 and is movable relative to the main body 310 between a first operational position and a second operational position. In the third preferred embodiment, the cover body 320 is slidable relative to and on the main body 310.

The cover body 320 includes a lens module 321, an image sensor module 322 and at least one elastic member 323 for applying a force on the lens module 321 toward the image sensor module 322. One of the lens module 321 and the image sensor module 322 has at least one protrusion thereon. In the third embodiment, the lens module 321 has at least one protrusion 321a thereon. The cover body 320 further defines a light opening 324 on an outside surface thereof. The lens module 321, the image sensor module 322 and the elastic member 323 are placed inside the cover body 321 and under the light opening 324. A distance between the lens module 321 and the image sensor module 322 is closest when the sliding mobile communication device 300 is in the first operational position, and is in a farthest status when the sliding mobile communication device 300 is in the second operational position.

The linking member 330 has a first end portion 331 coupled to the cover body 320 and an opposite second end portion 332 coupled to the main body 310. The first end portion 331 includes a sloping portion 331a interposed between the lens module 321 and the image sensor module 322. The protrusion 321a abuts against the sloping portion 331a. The linking member 330 is a movable rod. The linking member 330 can connect the cover body 320 and the main body 310 when the cover body 320 and the main body 310 slide relatively. When the linking member 330 is moved, the sloping portion 331a can be moved together (see arrows labeled in FIG. 7).

If the cover body 320 and the main body 310 move relative to each other, the linking member 330 will move at the same time. Because of a relative motion of the cover body 320 and the main body 310, the linking member 330 can make the sloping portion 331a move together (see arrows labeled in FIG. 7). Because of a slope angle change of the sloping portion 331a and a recovery force of the elastic member 323, the present invention can adjust the distance between the lens module 321 and the image sensor module 322.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A mobile communication device comprising:
   a main body;
   a cover body coupled to the main body, the cover body being movable relative to the main body between a first operational position and a second operational position; the cover body comprising a lens module, an image sensor module and at least one elastic member for applying a force on the lens module toward the image sensor module, one of the lens module and the image sensor module having at least one protrusion; and
   a linking member having a first end portion coupled to the cover body and an opposite second end portion coupled to the main body, the first end portion comprising a sloping portion interposed between the lens module and the image sensor module, the protrusion abutting against the sloping portion of the linking member, the linking member being driven by movement of the cover body relative to the main body to be movable between the first operational position where the protrusion abuts against and on a higher region of the sloping portion and the second operational position where the protrusion abuts against and on a lower region of the sloping portion thus adjusting a distance between the lens module and the image sensor module.

2. The mobile communication device as claimed as claim 1, wherein the cover body is slidable relative to and on the main body.

3. The mobile communication device as claimed as claim 1, wherein the cover body is rotatable relative to the main body.

4. The mobile communication device as claimed as claim 1, wherein the lens module comprises at least one lens and a holder.

5. The mobile communication device as claimed as claim 4, wherein the at least one protrusion includes a curved or rounded tip end portion formed on the holder.

6. The mobile communication device as claimed as claim 1, wherein the first end portion defines a through hole for allowing light to pass therethrough.

7. The mobile communication device as claimed as claim 6, wherein the sloping portion is located at opposite sides of the through hole.

8. The mobile communication device as claimed as claim 7, wherein the sloping portion is slidable relative to the protrusion.

9. The mobile communication device as claimed as claim 1, further comprising a hinge shaft having a gear portion, wherein the linking member is a flexible rack meshed with the gear portion.

10. The mobile communication device as claimed as claim 1, wherein the image sensor module is selected from a Charge-Coupled Device (CCD) and a Complementary Metal Oxide Semiconductor (CMOS) device.

11. The mobile communication device as claimed as claim 1, wherein the elastic member comprises at least a spring.

* * * * *